(12) United States Patent  
Macken

(10) Patent No.: US 9,812,159 B1  
(45) Date of Patent: Nov. 7, 2017

(54) BOND PAD SHARING BETWEEN A TEMPORARY CONTACT SENSOR AND A MULTIPLICITY OF READERS OF A RECORDING HEAD

(71) Applicant: Seagate Technology LLC, Cupertino, CA (US)

(72) Inventor: Declan Macken, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/443,344

(22) Filed: Feb. 27, 2017

Related U.S. Application Data

(60) Provisional application No. 62/335,303, filed on May 12, 2016.

(51) Int. Cl.
*G11B 21/02* (2006.01)
*G11B 5/48* (2006.01)
*G11B 5/00* (2006.01)

(52) U.S. Cl.
CPC .......... *G11B 5/4853* (2013.01); *G11B 5/4866* (2013.01); *G11B 2005/0021* (2013.01)

(58) Field of Classification Search
CPC ........... G11B 5/012; G11B 27/36; G11B 5/02; G11B 2220/20; G11B 2005/0021; G11B 2005/0005; G11B 5/314; G11B 2220/90; G11B 5/6005; G11B 5/59633; G11B 5/54
USPC .................................. 360/25, 31, 59, 69, 75
See application file for complete search history.

(56) References Cited

U.S. PATENT DOCUMENTS

| | | | |
|---|---|---|---|
| 8,159,780 B2 | 4/2012 | Brand | |
| 8,432,636 B2 | 4/2013 | Brand | |
| 9,058,829 B1 | 6/2015 | Wolf et al. | |
| 9,564,163 B2 * | 2/2017 | Contreras | G11B 5/607 |
| 2015/0103430 A1 | 4/2015 | Gadbois et al. | |
| 2015/0279419 A1 | 10/2015 | Trantham et al. | |

\* cited by examiner

*Primary Examiner* — Nabil Hindi
(74) *Attorney, Agent, or Firm* — Hollingsworth Davis, LLC

(57) ABSTRACT

A slider of a magnetic recording head includes a plurality of electrical bond pads and a plurality of readers comprising at least a first reader and a second reader. Each of the readers is coupled to a different pair of electrical bond pads. A temporary contact sensor is provided on the slider and coupled between a bond pad of the first reader and a bond pad of the second reader. The temporary contact sensor is configured for operation during a certification process of the apparatus and to become inoperable after completion of the certification process.

20 Claims, 6 Drawing Sheets

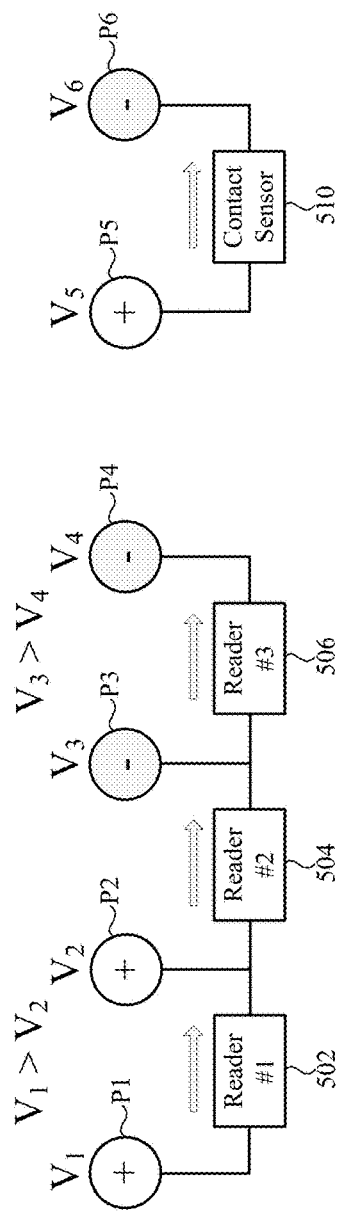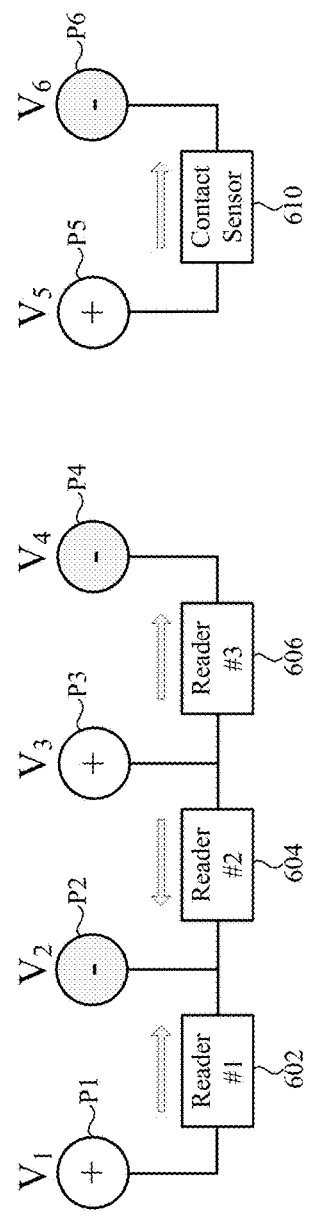

BOND PAD SHARING BETWEEN A TEMPORARY CONTACT SENSOR AND A MULTIPLICITY OF READERS OF A RECORDING HEAD

RELATED PATENT DOCUMENTS

This application claims the benefit of Provisional Patent Application Ser. No. 62/335,303 filed on May 12, 2016, to which priority is claimed pursuant to 35 U.S.C. §119(e), and which is incorporated herein by reference in its entirety.

SUMMARY

Various embodiments are directed to an apparatus which includes a slider of a magnetic recording head, a plurality of electrical bond pads provided on the slider, and a plurality of readers provided on the slider and comprising at least a first reader and a second reader. Each of the readers is coupled to a different pair of electrical bond pads. A temporary contact sensor is provided on the slider and coupled between a bond pad of the first reader and a bond pad of the second reader. The temporary contact sensor is configured for operation during a certification process of the apparatus and to become inoperable after completion of the certification process.

Other embodiments are directed to an apparatus which includes a slider of a magnetic recording head, a plurality of electrical bond pads provided on the slider, and at least a first reader, a second reader, and a third reader. Each of the readers is coupled to a different pair of electrical bond pads. A temporary contact sensor is coupled between a bond pad of the first reader and a bond pad of the second reader. During a certification process of the apparatus, the temporary contact sensor is operable and the first and second readers are inoperable. After completion of the certification process, the temporary contact sensor is inoperable and the first and second readers are operable. The third reader may be operable during the certification process, and is operable after completion of the certification process.

Further embodiments are directed to a method comprising moving a slider of a magnetic recording head relative to a magnetic storage medium. The slider comprises a plurality of readers each coupled to a different pair of electrical bond pads and a temporary contact sensor coupled between a bond pad of a first reader and a bond pad of a second reader. The method also comprises performing one or more operations using the temporary contact sensor during a certification process, at least the first and second readers being inoperable during the certification process. The method further comprises, after completion of the certification process, rendering the temporary contact sensor inoperable and performing read operations using the plurality of readers.

The above summary is not intended to describe each disclosed embodiment or every implementation of the present disclosure. The figures and the detailed description below more particularly exemplify illustrative embodiments.

BRIEF DESCRIPTION OF THE DRAWINGS

FIG. 5 illustrates one representative approach to biasing a multiplicity of readers connected together using a bond pad sharing configuration;

FIG. 6 illustrates another representative approach to biasing a multiplicity of readers connected together using a bond pad sharing configuration;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Data storage systems commonly include one or more transducers that write and read information to and from a magnetic storage medium. A recording transducer, for example, incorporates several distinct electrical and, in some implementations, optical components that require specified voltages/currents to operate properly. Representative examples of such electrical transducer components include a reader, a reader heater, a writer, and a writer heater, among other possible components. Some recording transducers incorporate one or more sensors, such as contact sensors, each requiring specified operating voltages/currents. Each of the electrically activated components of a transducer is electrically coupled to corresponding electrical contacts or bond pads of the transducer. Depending on the particular design of a given transducer, various bond pads can be configured as voltage sources, current sources, and ground contacts, and can also send and receive signals (e.g., write signals, readback signals, sensor signals, control signals). Because bond pads take up appreciable space on a transducer and adding bond pads can be very expensive due to changes in design and fabrication processes needed to accommodate such additional bond pads, it is desirable to minimize both the number of bond pads and changes to the bond pad configuration of a transducer.

An issue with adding additional components or any electrical feature in general to an existing slider or HGA is the real estate required to place bond pads which allow access to these new features. Some slider form factors, for example, can accommodate nine bond pads. In other sliders, a total of ten bond pads is likely feasible. Any increase in bond pad count above nine or ten (depending on the slider/HGA design) likely requires migration to a top bond pad configuration, which is both more technically challenging and expensive. An alternative to adding an additional bond pad above the designed-in pad count is to share an existing bond pad between two or more electrical devices on the slider.

Figure 1:
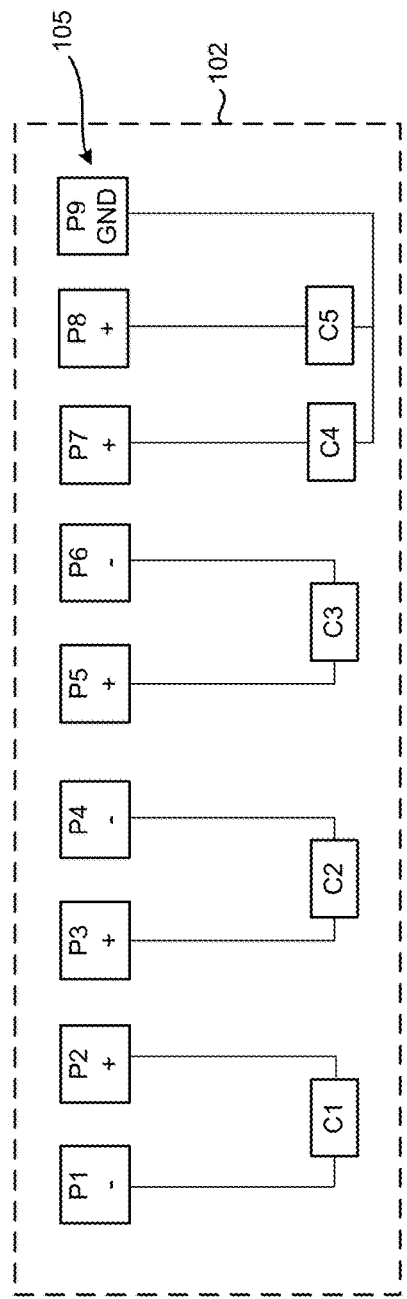
FIG. 1 illustrates an embodiment of a recording head that does not utilize pad sharing.
Figure 2:
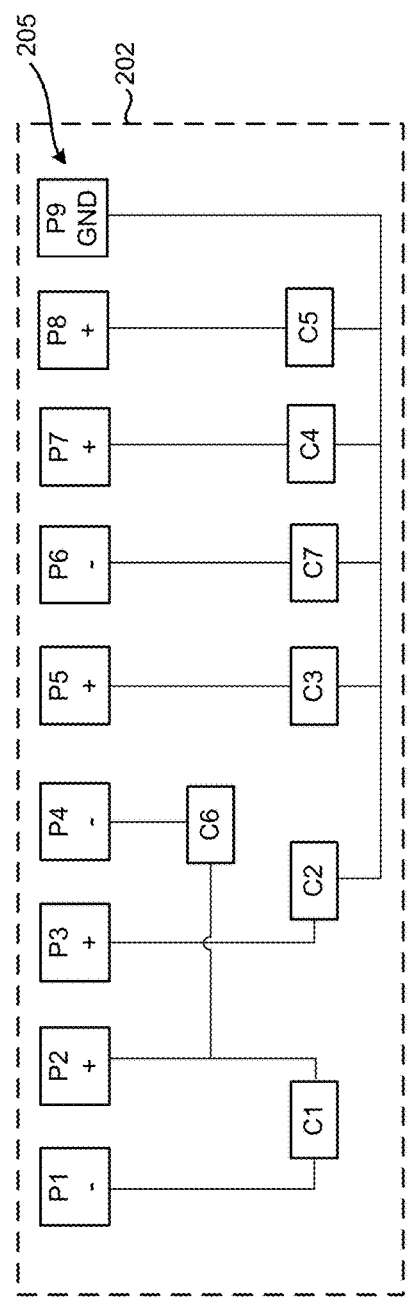
FIG. 2 illustrates a recording head that utilizes pad sharing according to embodiments of the present disclosure.

FIG. 1 illustrates an embodiment of a recording transducer that does not utilize pad sharing according to the present disclosure. FIG. 2 illustrates a recording transducer that utilizes pad sharing according to embodiments of the present disclosure. The bond pad layout shown in FIG. 1 is the same as that shown in FIG. 2, and the electrical components identified as C1-C5 in FIG. 1 are the same as those shown as components C1-C5 in FIG. 2 for purposes of illustration. It is understood that the bond pad layout, components, and wiring configuration shown in FIGS. 1 and 2 are provided for non-limiting illustrative purposes.

FIG. 1 illustrates a slider 102 that supports a recording transducer comprising a multiplicity of electrical components (C1-C5) coupled to a set 105 of bond pads (P1-P9). The set 105 of bond pads includes eight electrical bond pads (P1-P8) and one ground pad (P9, also referred to herein simply as ground). The term "electrical bond pad" refers to a bond pad that is coupled to a bias source, such as a voltage or current source (AC or DC), that provides power for an electrical component. The slider 102 shown in FIG. 1 utilizes eight electrical bond pads (P1-P8) to power five electrical components (C1-C5).

Electrical components C1-C3 can be referred to as dual-ended components, since each is coupled between a pair of electrical bond pads (e.g., one end of C1 is connected to negative pad P1 and the other end of C1 is connected to positive pad P2). Each dual-ended component requires two electrical bond pads for proper operation. Electrical components C4 and C5 can be referred to as single-ended components, since each is coupled between a single electrical bond pad and ground (e.g., one end of C5 is connected to positive pad P8 and the other end of C5 is connected to ground pad P9). Each single-ended component requires one electrical bond pad for proper operation. It is noted that the polarity of the electrical bond pads can change during operation, such that a given pad can be at a positive potential during one operating state and at a negative potential during another operating state.

FIG. 2 shows an apparatus according to various embodiments that includes a slider 202 comprising a plurality of electrical bond pads coupled to bias sources 205. The slider 202 further comprises a plurality of electrical components each coupled to at least one of the electrical bond pads. At least one of the electrical bond pads is shared between a plurality of the electrical components. According to some embodiments, the slider 202 supports a recording transducer comprising a multiplicity of electrical components (C1-C7) coupled to a set 205 of bond pads (P1-P9). As previously discussed, the set 205 of bond pads is the same as the bond pad set 205 shown in FIG. 1 (i.e., 8 electrical bond pads and 1 ground pad). In contrast to the slider 205 illustrated in FIG. 1 which supports five electrical components using eight electrical bond pads, the slider 205 shown in FIG. 2 supports seven electrical components while using the same number (i.e., 8) of electrical bond pads.

In FIG. 2, electrical bond pad P2 is shared between electrical components C1 and C6, thereby freeing up one electrical bond pad for other use or elimination. The electrical component C2 in FIG. 2, which performs the same function as C2 in FIG. 1, is implemented as a single-ended component, thereby freeing up one electrical bond pad for other use or elimination. By freeing up two electrical bond pads in the illustrative slider 202 shown in FIG. 2, two additional components (C6 and C7) have been added to the slider 202 as compared to the implementation illustrated in FIG. 1.

Sharing a common bond pad between two or more electrical components (e.g., readers) can raises the issue of bias contention as well as degraded performance (e.g., degraded common mode rejection). Such issues can be addressed by addition or modification of biasing and filtering circuitry, although this approach adds some degree of complexity to the design. An alternative and simpler approach involves pad sharing between electrical components having the same or similar biasing and/or filtering requirements. Another example of this approach involves a bond pad shared between electrical components that operate at different times or can be operated alternately.

The need for sharing of electrical bond pads has intensified in the advent of recording transducers or heads configured for heat-assisted magnetic recording (HAMR), also referred to as energy-assisted magnetic recording (EAMR), thermally-assisted magnetic recording (TAMR), and thermally-assisted recording (TAR). In addition to convention components, A HAMR head incorporates various optical components and sensors that require power supplied by the set of bond pads made available at the transducer. The increase in the number and type of components and sensors of a HAMR head significantly complicates the electrical bond pad connection and powering strategy for a particular HAMR head design.

Figure 3:
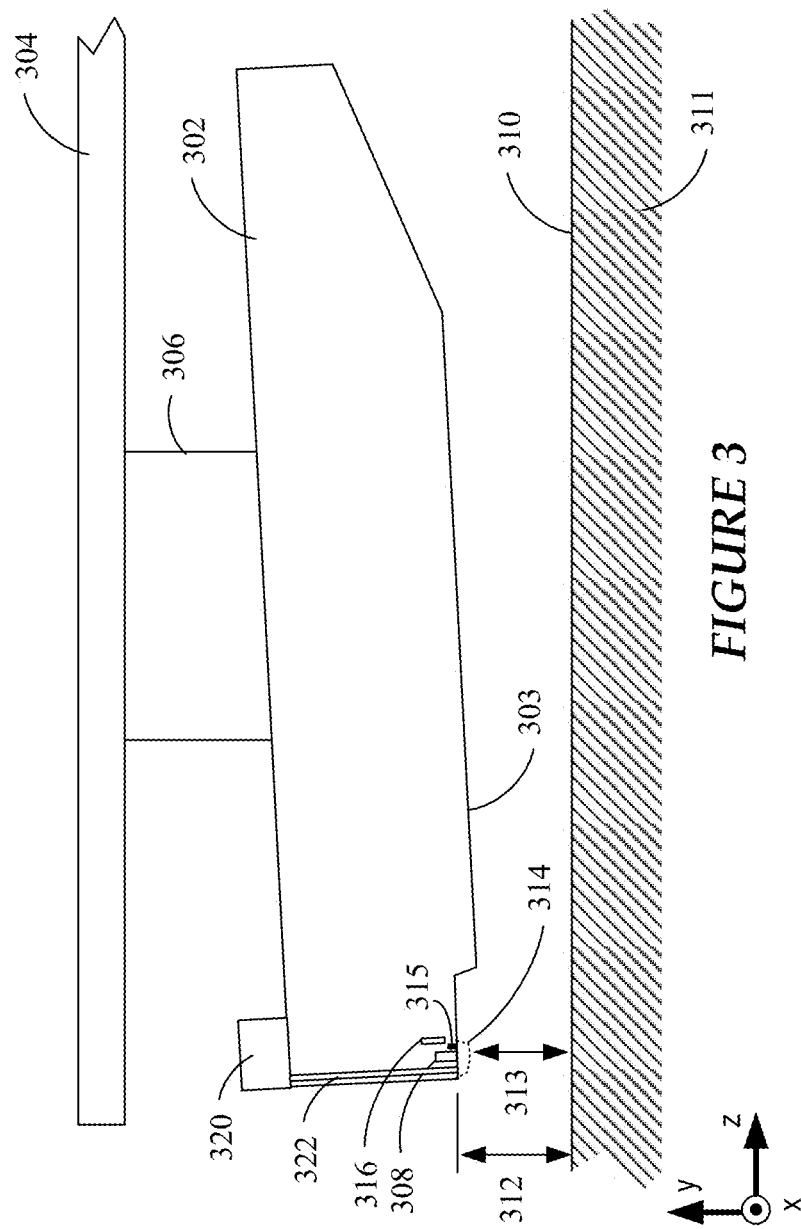
FIG. 3 shows a side view of a read/write head configured for heat-assisted magnetic recording according to a representative embodiment.

FIG. 3 shows a side view of a read/write transducer 302 configured for heat-assisted magnetic recording according to a representative embodiment. The read/write transducer 302 may be used in a magnetic data storage device, e.g., a hard disk drive. The read/write transducer 302 may also be referred to herein as a slider, read head, recording head, etc. The read/write transducer 302 is coupled to an arm 304 by way of a suspension 306 that allows some relative motion between the read/write transducer 302 and arm 304. The read/write transducer 302 includes read/write transducers 308 at a trailing edge that are held proximate to a surface 310 of a magnetic recording medium 311, e.g., magnetic disk. The read/write transducer 302 further includes a laser 320 and a waveguide 322. The waveguide 322 delivers light from the laser 320 to components (e.g., a near-field transducer) near the read/write transducers 308.

When the read/write transducer 302 is located over surface 310 of recording medium 311, a flying height 312 is maintained between the read/write transducer 302 and the surface 310 by a downward force of arm 304. This downward force is counterbalanced by an air cushion that exists between the surface 310 and an air bearing surface 303 (also referred to herein as a "media-facing surface") of the read/write transducer 302 when the recording medium 311 is rotating. It is desirable to maintain a predetermined slider flying height 312 over a range of disk rotational speeds during both reading and writing operations to ensure consistent performance. Region 314 is a "close point" of the read/write transducer 302, which is generally understood to be the closest spacing between the read/write transducers 308 and the magnetic recording medium 311, and generally defines the head-to-medium spacing 313.

To account for both static and dynamic variations that may affect slider flying height 312, the read/write transducer 302 may be configured such that a region 314 of the read/write transducer 302 can be configurably adjusted during operation in order to finely adjust the head-to-medium spacing 313. This is shown in FIG. 3 by a dotted line that represents a change in geometry of the region 314.

In this example, the geometry change may be induced, in whole or in part, by an increase or decrease in temperature of the region 314 via a heater 316. A thermal sensor 315 is shown situated at or near the close point 314 (e.g., adjacent the read/write transducers 308, such as near the near-field transducer) or can be positioned at other location of the ABS 303.

Figure 4:
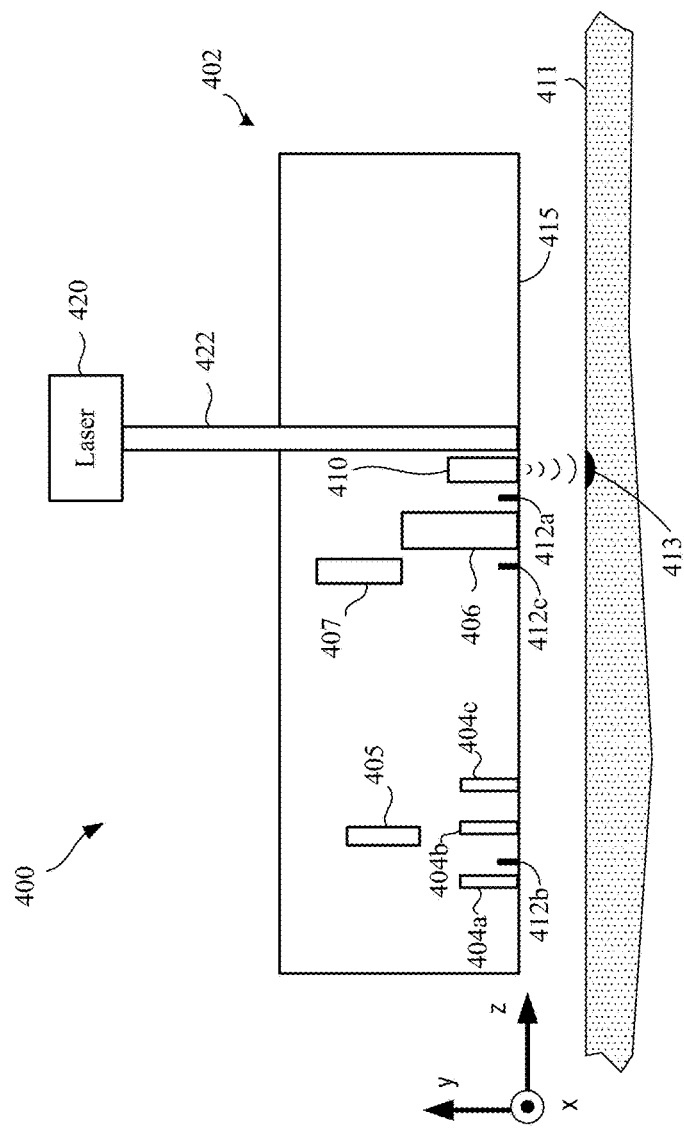
FIG. 4 shows a HAMR head arrangement in accordance with various embodiments.

FIG. 4 shows a HAMR head arrangement 400 in accordance with various embodiments. The recording head arrangement 400 includes a slider 402 positioned proximate a rotating magnetic medium 411. The slider 402 includes a multiplicity of readers 404 and a writer 406 proximate the ABS 415 for respectively reading and writing data from/to the magnetic medium 411. In some embodiments, the slider 402 can include two readers (e.g., 404a and 404b). In other embodiments, the slider 402 can include three readers (e.g., 404a, 404b, and 404c). Although one writer 406 is shown in FIG. 4, the slider 402 can include two such writers 406.

The writer 406 is located adjacent a near-field transducer (NFT) 410 which is optically coupled to a light source 420 (e.g., laser diode) via a waveguide 422. The light source 420 can be mounted external, or integral, to the slider 402. The light source 420 energizes the NFT 410 via the waveguide 422. The writer 406 includes a corresponding heater 407, and the readers 404a-c include one or more corresponding heaters 405 according to various embodiments. The writer heater 407 can be powered to cause protrusion of the ABS 415 predominately in the ABS region at or proximate the writer 406, and the reader heater(s) 405 can be powered to cause protrusion of the ABS 415 predominately in the ABS region at or proximate the readers 404. Power can be controllably delivered independently to the heaters 407 and 405 to adjust the fly height (e.g., clearance) of the slider 402 relative to the surface of the recording medium 411. One or more thermal sensors 412a, 412b, 412c can be situated at various locations on the slider 402 at or near the ABS 415 for purposes of monitoring temperature, head-medium spacing changes, and head-medium contact.

According to various embodiments, one of the thermal sensors 412a-c is configured as a temporary contact sensor coupled to two of the readers 404a-c in a bond sharing configuration. The temporary contact sensor, e.g., 412c, is operable during a certification process in which various procedures are performed by the hard disk drive (HDD) prior to shipping the drive from the factory. Such procedures typically include testing components of the slider (e.g., at room temperature and at elevated temperatures), setting clearance of the slider, and performing topographical mapping of magnetic media (e.g., asperity detection and mapping using the temporary contact sensor 412c). After completion of the certification process, the temporary contact sensor 412c is rendered inoperable (e.g., electrically and/or physically).

A HAMR device utilizes the types of optical devices described above to heat a magnetic recording media (e.g., hard disk) in order to overcome superparamagnetic effects that limit the areal data density of typical magnetic media. When writing with a HAMR device, the electromagnetic energy (e.g., laser or light) is concentrated onto a small hot spot 413 over the track of the magnetic medium 411 where writing takes place, as shown in FIG. 4. The light from the source 420 propagates to the NFT 410, e.g., either directly from the source 420 or through the mode converter or by way of a focusing element. Other optical elements, such as couplers, mirrors, prisms, etc., may also be formed integral to the slider.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 413 is on the order of 50 nm or less. Thus, the desired hot spot size is well below half the wavelength of the light. Optical focusers cannot be used to obtain the desired hot spot size, being diffraction limited at this scale. As a result, the NFT 410 is employed to create a hot spot on the media.

The NFT 410 is a near-field optics device configured to generate local surface plasmon resonance at a designated (e.g., design) wavelength. The NFT 410 is generally formed from a thin film of plasmonic material (e.g., gold, silver, copper) on a substrate. In a HAMR slider 402, the NFT 410 is positioned proximate the write pole of the writer 406. The NFT 410 is aligned with the plane of the ABS 415 parallel to the read/write surface of the magnetic medium 411. The NFT 410 achieves surface plasmon resonance in response to the incident electromagnetic energy. The plasmons generated by this resonance are emitted from the NFT 410 towards the magnetic medium 411 where they are absorbed to create the hot spot 413. At resonance, a high electric field surrounds the NFT 410 due to the collective oscillations of electrons at the metal surface (e.g., substrate) of the magnetic medium 411. At least a portion of the electric field surrounding the NFT 410 gets absorbed by the magnetic medium 411, thereby raising the temperature of the spot 413 on the medium 411 as data is being recorded.

A continuing trend in the data storage industry is to provide storage devices with ever higher data storage capacities and data densities. Some recent product designs have proposed the use of multiple read sensors (readers) in a transducer reader section. The use of multiple readers allows the concurrent recovery of data from multiple adjacent data tracks using two-dimensional magnetic recording (TDMR). Multiple readers can also be used to generate separate readback signals from the same data track during so-called multi-signal magnetic recording (MSMR) operations. According to some embodiments, a slider of a magnetic recording head includes at least a first reader and a second reader. In other embodiments, a slider of a magnetic recording head includes at least a first reader, a second reader, and a third reader. In these and other multi-reader embodiments of the disclosure, the slider includes a contact sensor that is temporarily used during a HDD certification process, and subsequently rendered inoperable after completion of the certification process. Bond pad sharing is utilized between the temporary contact sensor and two of the readers so as to avoid allocating a dedicated pair of bond pads to the temporary contact sensor.

FIG. 5 illustrates one representative approach to biasing a multiplicity of readers connected together using a bond pad sharing configuration. In the representative bond pad sharing configuration shown in FIG. 5, three readers 502, 504, and 506 are connected to four bond pads P1-P4. A contact sensor 510 is coupled to dedicated bond pads P5 and P6. The first reader 502 is coupled to bond pads P1 and P2, and a third reader 506 is coupled to bond pads P3 and P4. The second reader 504 is coupled to bond pad P2, shared with the first reader 502, and bond pad P3, shared with the third reader 506.

Forward biasing all of the readers 502, 504, and 506 can be achieved by setting (i) the voltage $V_1$ at bond pad P1 to the greater than the voltage $V_2$ at bond pad P2; (ii) the voltage $V_2$ at bond pad P2 greater than the voltage $V_3$ at bond pad P3; and (iii) the voltage $V_3$ at bond pad P3 greater than the voltage $V_4$ at bond pad P4. For example, the following voltage settings can apply: $V_1$=+210 mV, $V_2$=+70 mV, $V_3$=−70 mV, and $V_4$=−210 mV. Although forward biasing all of the readers 502, 504, and 506 reduces the noise penalty, this biasing approach necessarily increases the head-disk-interface (HDI) voltage stress, indicated by the relatively large voltages $V_1$ and $V_4$.

FIG. 6 illustrates another representative approach to biasing a multiplicity of readers connected together using a bond pad sharing configuration. In the representative bond pad sharing configuration shown in FIG. 6, three readers 602, 604, and 606 are connected to four bond pads P1-P4. A contact sensor 610 is coupled to dedicated bond pads P5 and P6. According to the configuration shown in FIG. 6, a first reader 602 is forward biased by setting the voltage $V_1$ (positive) at bond pad P1 to a voltage greater than the voltage $V_2$ (negative) at bond pad P2. A second reader 604 is reversed biased by setting the voltage $V_2$ (negative) at bond pad P2 to a voltage less than the voltage $V_3$ (positive) at bond pad P3. A third reader 606 is forward bias by setting the voltage $V_3$ (positive) to a voltage greater than the voltage $V_4$ (negative) at bond pad P4.

In illustrative example shown in FIG. 6, the following voltage settings can apply: $V_1$=+70 mV, $V_2$=−70 mV, $V_3$=+70 mV, and $V_4$=−70 mV. Although the voltage stress in the configuration shown in FIG. 6 is significantly less than that of the configuration shown in FIG. 5, the second reader 604 is reversed biased relative to the first and third readers 602 and 606. It is been found that reverse biasing the second reader 604 or other reader in a bond pad sharing arrangement leads to instability of the reverse biased reader.

For reasons discussed above, the representative approaches to biasing a multiplicity of readers using the bond pad sharing configurations illustrated in FIGS. 5 and 6 suffer from several deficiencies. For example, the configuration shown in FIG. 5 suffers from increased HDI voltage stress, whereas the configuration shown in FIG. 6 suffers from reader instability. Moreover, neither of the bond pad sharing configurations shown in FIGS. 5 and 6 provides ideal biasing of individual readers using a dedicated pair of bond pads. Rather, each configuration shown in FIGS. 5 and 6 requires bond pad sharing between readers during operation.

Figure 7A:
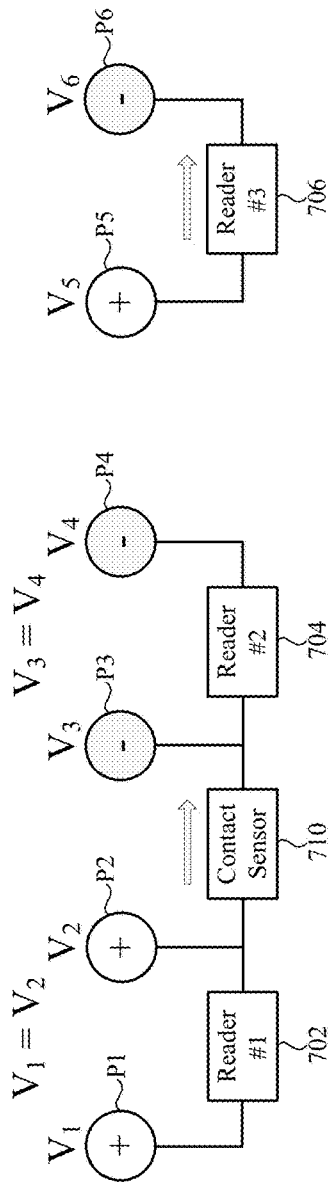
FIG. 7A illustrates a circuit configured to implement bond pad sharing between a temporary contact sensor and a multiplicity of readers for use during a certification process in accordance with various embodiments.

FIG. 7A illustrates bond pad sharing between a temporary contact sensor and a multiplicity of readers in accordance with various embodiments. According to FIG. 7A, a slider of a magnetic recording head includes three readers 702, 704, and 706, and a temporary contact sensor 710. A first reader 702 is coupled to bond pads P1 and P2. A second reader 704 is coupled to bond pads P3 and P4. A third reader 706 is coupled to bond pads P5 and P6. The temporary contact sensor 710 is coupled to bond pad P2, which is shared with the first reader 702, and bond pad P3, which is shared with the second reader 704. The temporary contact sensor 710 can be located anywhere on the slider, such as near a close point of the writer (e.g., a return pole) or a close point of a reader 702, 704, or 706. It is noted that the slider may include additional contact sensors (not shown) that are used during normal operation of the recording head. For example, a contact sensor can be located at a close point of the writer/NFT and/or a close point of one or more of the readers 702, 704, and 706.

The contact sensor 710 can be implemented in a variety of technologies, such as a resistance thermal sensor, a thermistor, and a thermocouple, for example. Certain embodiments disclosed herein are directed to contact sensors having a temperature coefficient of resistance (referred to herein as TCR sensors), it being understood that other forms and/or means of sensing temperature are contemplated. Some of the TCR sensors described herein are referred to as Differential-ended Thermal Coefficient of Resistance (DETCR) sensors. A DETCR sensor is configured to operate with each of its two electrical contacts (i.e., ends) connected to respective bias sources provided by a pair of electrical bond pads of the slider. Another example of a TCR sensor is a ground-split (GS) temperature coefficient of resistance sensor, in which one end of the GSTCR is coupled to ground and the other is coupled to a bias source via an electrical bond pad of the slider.

The circuit shown in FIG. 7A is configured for operation during a certification process according to various embodiments. During the certification process, the first reader 702 and the second reader 704 are not used and therefore rendered temporarily inoperable. Rendering the first and second reader 702 and 704 temporarily inoperable can be achieved by applying a common mode voltage to the bond pads respectively coupled to the two readers 702 and 704. More particularly, a common mode voltage can be applied across the first reader 702 by applying the same voltage ($V_1$=$V_2$) at bond pads P1 and P2. As shown, the voltages $V_1$ and $V_2$ are the same positive voltage (e.g., $V_1$=$V_2$=+150 mV). A common mode voltage can be applied across the second reader 704 by applying the same voltage ($V_3$=$V_4$) at bond pads P3 and P4. As shown, the voltages $V_3$ and $V_4$ are the same negative voltage (e.g., $V_3$=$V_4$=−150 mV).

During the certification process, the third reader 706 can be active, in which case a differential voltage is applied across the third reader 706 (e.g., $V_5$ applied to bond pad P5=+70 mV, $V_6$ applied to bond pad P6=−70 mV). As can be seen in FIG. 7A, a voltage drop is created across the contact sensor 710 due to the positive voltage $V_2$ at bond pad P2 and the negative voltage $V_3$ at bond pad P3. As such, the contact sensor 710 can be used during certification process, such as for setting clearance and detecting/mapping thermal asperities.

Figure 7B:
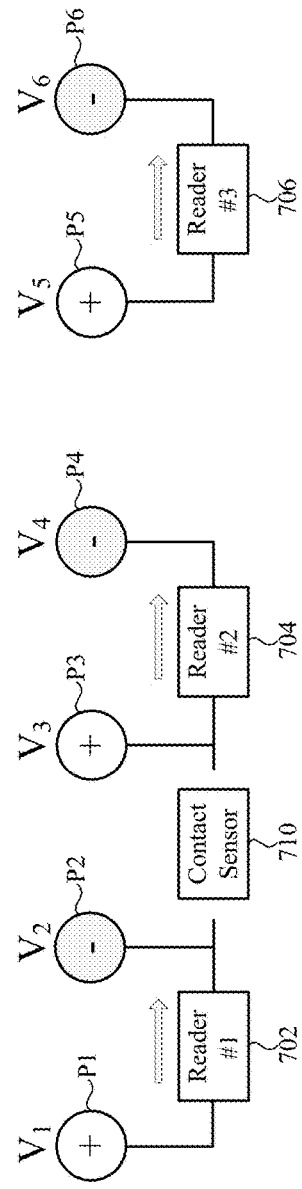
FIG. 7B shows the circuit of FIG. 7A configured for operation after the certification process, such as during normal operation of the hard disk drive in accordance with various embodiments.

The circuit shown in FIG. 7B is configured for operation after the certification process, such as during normal operation of the hard disk drive. After completion of the certification process, the temporary contact sensor 710 is rendered inoperable and the three readers 702, 704, and 706 are biased for normal operation. According to some embodiments, the temporary contact sensor 710 is configured to become inoperable in response to receiving a predetermined signal. For example, the predetermined signal can be a signal that creates an open circuit within the contact sensor 710 (e.g., which operates like a fuse). The predetermined signal can be a voltage signal above the operational voltage rating of the contact sensor 710. For example, the temporary contact sensor 710 can have a maximum voltage rating of about 275 mV over a service life of a predetermined duration (e.g., <5 years). The contact sensor 710 can be rendered physically inoperable by applying a differential mode voltage of approximately 350 mV across bond pads P2 and P3.

Application of the predetermined signal across bond pads P2 and P3 effectively creates an open circuit between bond pads P2 and P3, as is shown in FIG. 7B. Rendering the temporary contact sensor 710 inoperable severs the conductivity path between the first reader 702 and second reader 704. Accordingly, physically removing the contact sensor 710 from the circuit shown in FIGS. 7A and 7B results in the ideal scenario of biasing individual readers using a dedicated pair of bond pads. More particularly, after rendering the temporary contact sensor 710 inoperable, the first reader 702 is biased using bond pads P1 and P2, the second reader 704 is biased using bond pads P3 and P4, and the third reader 706 is biased using bond pads P5 and P6. Rendering the temporary contact sensor 710 inoperable effectively terminates bond pad sharing between the readers 702 and 704 (and 706).

In the circuit shown in FIG. 7B, the first reader 702 is biased by a positive voltage $V_1$ applied at bond pad P1 and a negative voltage $V_2$ applied to bond pad P2. The second reader 704 is biased by a positive voltage $V_3$ applied at bond pad P3 and a negative voltage $V_4$ applied to bond pad P4. The third reader 706 is biased by a positive voltage $V_5$ applied at bond pad P5 and a negative voltage $V_6$ applied to bond pad P6. For example, the following voltage settings can apply: $V_1$=+70 mV, $V_2$=−70 mV, $V_3$=+70 mV, $V_4$=−70 mV, $V_5$=+70 mV, and $V_6$=−70 mV. Advantageously, the circuit shown in FIG. 7B provides for reduced HDI voltage stress and forward biasing of each of the three readers 702, 704, and 706, in contrast to the circuits shown in FIGS. 5 and 6.

Figure 8A:
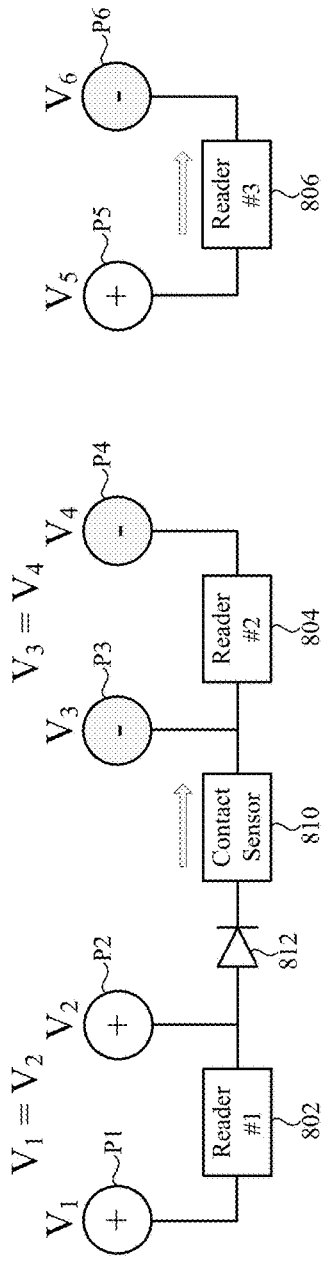
FIG. 8A illustrates a circuit configured to implement bond pad sharing between a temporary contact sensor and a multiplicity of readers for use during a certification process in accordance with other embodiments.

FIG. 8A illustrates bond pad sharing between a temporary contact sensor and a multiplicity of readers in accordance with other embodiments. According to FIG. 8A, a slider of a magnetic recording head includes three readers 802, 804, and 806, and a temporary contact sensor 810. A first reader 802 is coupled to bond pads P1 and P2. A second reader 804 is coupled to bond pads P3 and P4. A third reader 806 is coupled to bond pads P5 and P6. The temporary contact sensor 810 is coupled to bond pad P2, which is shared with the first reader 802, and bond pad P3, which is shared with the second reader 804. The contact sensor 810 may be of a type previously described. A diode 812 is coupled in series with the contact sensor 810. As shown, the diode 812 and the contact sensor 810 are coupled between bond pads P2 and P3. The diode 812 can be formed during slider fabrication as a standard diode (e.g., p-n diode) or as a Schottky diode (e.g., SiC Schottky diode). As was discussed above, the temporary contact sensor 810 can be located anywhere on the slider, such as near a close point of the writer or a close point of a reader 802, 804, or 806. As was also discussed, the slider may include additional contact sensors (not shown) that are used during normal operation of the recording head.

The circuit shown in FIG. 8A is configured for operation during a certification process according to various embodiments. During the certification process, the first reader 802 and the second reader 804 are not used and therefore rendered temporarily inoperable. Rendering the first and second reader 802 and 804 temporarily inoperable can be achieved by applying a common mode voltage to the bond pads respectively coupled to the two readers 802 and 804. For example, a common mode voltage can be applied across the first reader 802 by applying the same voltage (e.g., $V_1$=$V_2$=+150 mV) at bond pads P1 and P2. A common mode voltage can be applied across the second reader 804 by applying the same voltage (e.g., $V_3$=$V_4$=−150 mV) at bond pads P3 and P4. During the certification process, the third reader 806 can be active, in which case a differential voltage is applied across the third reader 806 (e.g., $V_5$ applied to bond pad P5=+70 mV, $V_6$ applied to bond pad P6=−70 mV).

As can be seen in FIG. 8A, a voltage drop is created across the contact sensor 810 due to the positive voltage $V_2$ at bond pad P2 and the negative voltage $V_3$ at bond pad P3. This voltage drop forward biases the diode 812 which allows the contact sensor 810 to be used during certification process, such as for setting clearance and detecting/mapping thermal asperities.

Figure 8B:
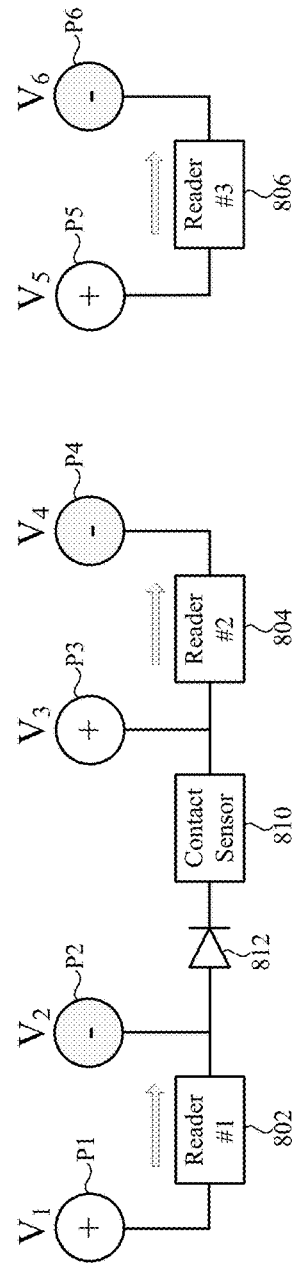
FIG. 8B shows the circuit of FIG. 8A configured for operation after the certification process, such as during normal operation of the hard disk drive in accordance with various embodiments.

The circuit shown in FIG. 8B is configured for operation after the certification process, such as during normal operation of the hard disk drive. After completion of the certification process, the temporary contact sensor 810 is rendered inoperable and the three readers 802, 804, and 806 are biased for normal operation. According to some embodiments, the temporary contact sensor 810 is configured to become inoperable in response to reverse biasing the diode 812. Reverse biasing the diode 812 can be achieved by applying a negative voltage $V_2$ at bond pad P2 and a positive voltage $V_3$ at bond pad P3.

Reverse biasing the diode 812 effectively renders the temporary contact sensor 810 electrically inoperable. Accordingly, electrically removing the contact sensor 810 from the circuit shown in FIG. 8B results in the ideal scenario of biasing individual readers using a dedicated pair of bond pads. More particularly, the first reader 802 is biased using bond pads P1 and P2, the second reader 804 is biased using bond pads P3 and P4, and the third reader 803 is biased using bond pads P5 and P6. Rendering the temporary contact sensor 810 inoperable effectively terminates bond pad sharing as between the readers 802 and 804 (and 806).

In the circuit shown in FIG. 8B, the first reader 802 is biased by a positive voltage $V_1$ applied at bond pad P1 and a negative voltage $V_2$ applied to bond pad P2. The second reader 804 is biased by a positive voltage $V_3$ applied at bond pad P3 and a negative voltage $V_4$ applied to bond pad P4. The third reader 806 is biased by a positive voltage $V_5$ applied at bond pad P5 and a negative voltage $V_6$ applied to bond pad P6. For example, the following voltage settings can apply: $V_1$=+70 mV, $V_2$=−70 mV, $V_3$=+70 mV, $V_4$=−70 mV, $V_5$=+70 mV, and $V_6$=−70 mV. Advantageously, the circuit shown in FIG. 8B provides for reduced HDI voltage stress and forward biasing of each of the three readers 802, 804, and 806, in contrast to the circuits shown in FIGS. 5 and 6.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:
1. An apparatus, comprising:
a slider of a magnetic recording head;
a plurality of electrical bond pads provided on the slider;
a plurality of readers provided on the slider and comprising at least a first reader and a second reader, each of the readers coupled to a different pair of electrical bond pads; and
a temporary contact sensor provided on the slider and coupled between a bond pad of the first reader and a bond pad of the second reader;

wherein the temporary contact sensor is configured for operation during a certification process of the apparatus and to become inoperable after completion of the certification process.

2. The apparatus of claim 1, wherein:
during the certification process, the temporary contact sensor is operable and the first and second readers are inoperable; and
after completion of the certification process, the temporary contact sensor is inoperable and the first and second readers are operable.

3. The apparatus of claim 1, wherein:
during the certification process, the pair of bond pads coupled to the first reader and the pair of bond pads coupled to the second reader are respectively configured to receive a common mode voltage; and
after completion of the certification process, the pair of bond pads coupled to the first reader and the pair of bond pads coupled to the second reader are respectively configured to receive a differential mode voltage.

4. The apparatus of claim 1, wherein:
the first reader is coupled to a first bond pad and a second bond pad;
the second reader is coupled to a third bond pad and a fourth bond pad; and
the temporary contact sensor is coupled to the second and third bond pads.

5. The apparatus of claim 1, wherein the temporary contact sensor is configured to become inoperable in response to receiving a predetermined signal.

6. The apparatus of claim 5, wherein the predetermined signal is a signal that creates an open circuit within the temporary contact sensor.

7. The apparatus of claim 5, wherein the predetermined signal is a differential voltage signal above an operational voltage rating of the temporary contact sensor.

8. The apparatus of claim 1, wherein:
the temporary contact sensor is coupled to a diode; and
the temporary contact sensor and the diode are coupled between the respective bond pads of the first and second readers.

9. The apparatus of claim 5, wherein:
the diode is configured to be forward biased during the certification process; and
the diode is configured to be reversed biased after completion of the certification process.

10. The apparatus of claim 1, wherein the slider is configured for heat-assisted magnetic recording and comprises:
an optical waveguide configured to couple to a light source; and
a near-field transducer configured to couple to the optical waveguide.

11. An apparatus, comprising:
a slider of a magnetic recording head;
a plurality of electrical bond pads provided on the slider;
at least a first reader, a second reader, and a third reader, each of the readers coupled to a different pair of electrical bond pads; and
a temporary contact sensor coupled between a bond pad of the first reader and a bond pad of the second reader;
wherein:
during a certification process of the apparatus, the temporary contact sensor is operable and the first and second readers are inoperable; and
after completion of the certification process, the temporary contact sensor is inoperable and the first and second readers are operable.

12. The apparatus of claim 11, wherein:
during the certification process, the pair of bond pads coupled to the first reader and the pair of bond pads coupled to the second reader are respectively configured to receive a common mode voltage; and
after completion of the certification process, the pair of bond pads coupled to the first reader and the pair of bond pads coupled to the second reader are respectively configured to receive a differential mode voltage.

13. The apparatus of claim 11, wherein:
the first reader is coupled to a first bond pad and a second bond pad;
the second reader is coupled to a third bond pad and a fourth bond pad;
the third reader is coupled to a fifth bond pad and a sixth bond pad; and
the temporary contact sensor is coupled to the second and third bond pads.

14. The apparatus of claim 11, wherein the temporary contact sensor is configured to become inoperable in response to receiving a predetermined signal.

15. The apparatus of claim 14, wherein the predetermined signal is a signal that creates an open circuit within the temporary contact sensor.

16. The apparatus of claim 14, wherein the predetermined signal is a differential voltage signal above an operational voltage rating of the temporary contact sensor.

17. The apparatus of claim 11, wherein:
the temporary contact sensor is coupled to a diode; and
the temporary contact sensor and the diode are coupled between the respective bond pads of the first and second readers.

18. The apparatus of claim 17, wherein:
the diode is configured to be forward biased during the certification process; and
the diode is configured to be reversed biased after completion of the certification process.

19. The apparatus of claim 11, wherein the slider is configured for heat-assisted magnetic recording and comprises:
an optical waveguide configured to couple to a light source; and
a near-field transducer configured to couple to the optical waveguide.

20. A method, comprising:
moving a slider of a magnetic recording head relative to a magnetic storage medium, the slider comprising a plurality of readers each coupled to a different pair of electrical bond pads and a temporary contact sensor coupled between a bond pad of a first reader and a bond pad of a second reader;
performing one or more operations using the temporary contact sensor during a certification process, at least the first and second readers being inoperable during the certification process; and
after completion of the certification process, rendering the temporary contact sensor inoperable and performing read operations using the plurality of readers.

* * * * *